United States Patent Office 3,073,836
Patented Jan. 15, 1963

---

3,073,836
ACYL HYDRAZINE DERIVATIVES OF BIS(4-METHYLAMINO-3-METHYLPHENYL)METHANE
Jack M. Tien, Mount Vernon, N.Y.
(% Dr. I. M. Hunsberger, Innwood, Amherst, Mass.)
No Drawing. Filed Aug. 14, 1959, Ser. No. 833,690
19 Claims. (Cl. 260—295)

This invention relates to new coloring matters, more particularly to the coloring matters of the acyl hydrazine derivatives of bis(4-methylamino-3-methylphenyl)methane having the structural formula

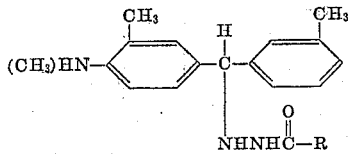

wherein R is a cyclic monovalent radical of the aromatic series, both benzenoid and nonbenzenoid compounds, such as benzene series, naphthalene series, pyridine series, thiophene series, furan series, cycloheptatriene series and sydnone series or any other cyclic compounds which exhibit aromatic nature.

The new coloring matters are substantially colorless or non-dye colored, in their normal state, yet are capable of generating intense color immediately upon being brought into sufficiently intimate contact with a proton donating agent such as aluminum silicates, heteropolyacids, and phenols. The contact may be achieved by the use of solvents, and by the use of pressure or heat with or without solvents.

The color varies with solvents and with the nature of the proton donating agents. In general the novel compounds produce a reddish purple color on being rubbed with attapulgite clay, a blue color with n-propyl or octyl gallate, and a violet color with phosphotungstic acid. 1-bis(4-methylamino-3-methylphenyl)methyl-2-(2,4-dichlorobenzoyl)hydrazine in paraffin oil or in chlorinated biphenyl gives a glue color on attapulgite clay. The color with this clay is reddish purple, when the paraffin oil is replaced by methanol or ethanol.

The color fastness may be varied to some extent by the choice of the proton donating agent. While the resistance to fading of the reddish purple produced by clays is moderate, the violet color produced by phosphotungstic acid is permanent.

The novel compounds of the present invention in their substantially colorless forms produce unexpected vivid violet colors on being brought into contact with a heteropolyacid such as phosphotungstic acid, phosphotungstomolybdic acid, and phosphomolybdic acid. This is a surprise and contrast to the blue colors produced by the similar compounds disclosed in my copending companion application Serial No. 677,165 filed August 8, 1957, now U.S. Patent 2,900,388.

The novel compounds of my invention are cheap to manufacture, stable in storage and handling, and useful as coloring agents.

One way to manufacture my compounds involves reaction of the selected acid hydrazide with bis(4-methylamino-3-methylphenyl)methanol or bis(4-methylamino-3-methylphenyl)methylamine or with di(4-methylamino-3-methylphenyl)ketone followed by hydrogenation, suitably in polar solvents such as methanol, ethanol and di-oxane according to the following respective equations:

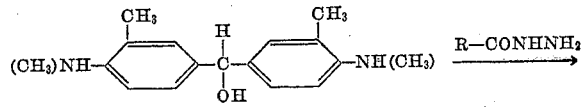

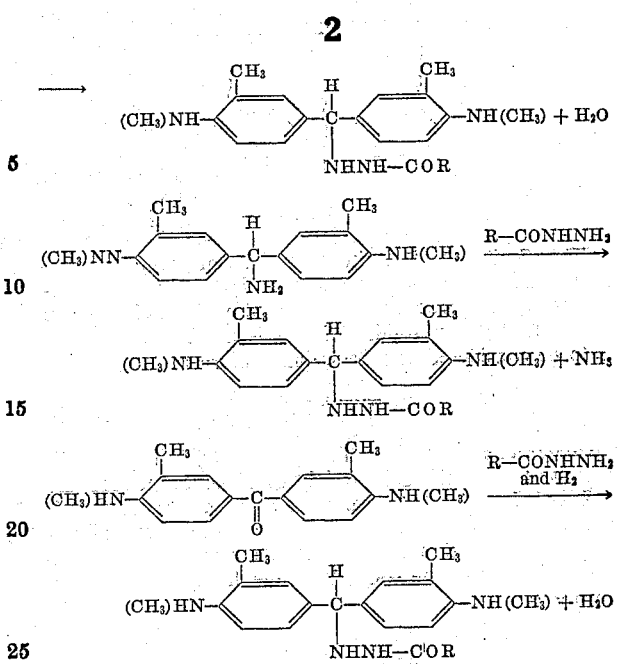

R, as used here and elsewhere herein, is a cyclic monovalent radical group of the aromatic series as defined above, such as any halogenated, nitrated, lower alkyl and lower alkoxylated phenyl group of which examples are chlorinated phenyl, chloronitrophenyl, chloromethylphenyl and methoxyphenyl; halogenated, nitrated, lower alkyl, and lower alkoxylated pyridiyl group of which examples are 2,6-dichloro-4-pyridyl, 2,6-dihydroxy-4-pyridyl, methylpyridyl and tetrachloro-4-pyridyl; halogenated, nitrated, and lower alkyl thienyl group of which examples are chloro-2-thienyl, nitro-2-thienyl, 5-bromo-3-nitro-2-thienyl and methyl-2-thienyl; halogenated, and nitrated furyl group of which examples are 2-furyl, 5-nitro-2-furyl, 5-bromo-2-furyl and 5-chloro-3-nitro-2-furyl.

I have accurately defined my invention, its scope and its uses. Now I shall proceed to illustrate but not limit my invention by the following working examples:

*Example 1*

An equimolar mixture of bis(4-methylamino-3-methylphenyl)methanol and benzoic acid hydrazide is dissolved in about 20 times its weight of absolute ethanol and refluxed for about 8 hours. The resulting mixture is evaporated to dryness. The dark solid residue is dissolved in boiling benzene and decolorized with activated charcoal. The resulting colorless crystalline products have the following structural formula

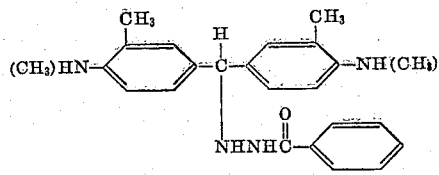

Instead of benzoic acid hydrazide, naphthoic acid hydrazide or any other acid hydrazide of the aromatic series, especially with at least one electrophilic substituent group on the ring, may be used, the corresponding product is also a crystalline solid.

*Example 2*

An equimolar mixture of 3-nitrobenzoic acid hydrazide and bis(4-methylamino-3-methylphenyl)methanol is dissolved at least 30 times its weight of absolute ethanol and refluxed for about ten hours. The resulting solution is concentrated by evaporation until the solids appear.

After cooling to about 0° C., the brownish dark solids are separated by filtration, dissolved in sufficient hot benzene and treated with activated charcoal. The resulting light orange yellow crystalline solids have the following structural formula:

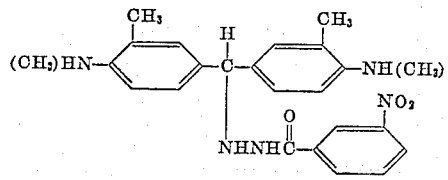

The 2-nitro and 4-nitro isomers, and monochloromononitro compounds may be prepared in the same manner with the corresponding acid hydrazide, and they are also orange yellow solids. Since this is not a dye color, it is to be considered as substantially colorless.

*Example 3*

An equimolar mixture of bis(4-methylamino-3-methylphenyl)methanol and 4-chlorobenzoic acid hydrazide is dissolved in 19 times its weight of absolute ethanol and refluxed for about 6 hours. The reaction mixture is evaporated to dryness. The greenish dark residue is treated with activated charcoal in hot benzene and the resulting white crystalline solids have the following structural formula:

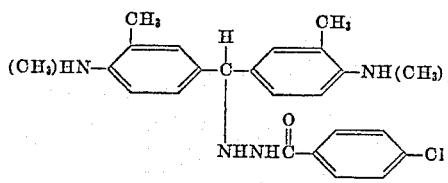

Other isomeric chloro compounds and bromo compounds may be prepared in the same manner with the corresponding acid hydrazide; and they are all white solid materials.

*Example 4*

An equimolar mixture of bis(4-methylamino-3-methylphenyl)methanol and 2,4-dichlorobenzoic acid hydrazide is dissolved in thirty times its weight of absolute alcohol and refluxed for a few hours until no more free hydrazide can be detected by the use of ethyl glyoxylate. The reaction mixture is evaporated to dryness. The dark solid residue is treated with activated charcoal in hot benzene and the resulting colorless crystalline solids have the following structural formula:

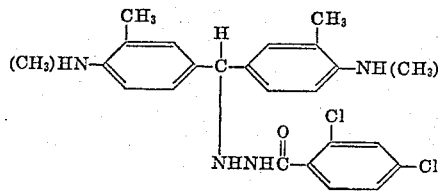

Similarly, the other isomeric dichloro compounds or dibromo compounds may be prepared using the same molecular proportion, and they are all white crystalline solid materials, such as 2,3; 2,5; 2,6; 3,4; and 3,5-dihalo acyl hydrazines.

*Example 5*

Chlorine is passed into 56 g. of benzoyl chloride containing 0.4 g. of fine iron powder and 0.2 g. of iodine at 50° to 60° C. until there is an increase in weight of 32 g. After removal of the hydrogen chloride and free chlorine by passing a current of air through the mixture, the net in weight is reduced to 28 g., which corresponds to the theoretical quantity of the dichlorobenzoyl chloride. The resulting product is esterified by refluxing with 250 ml. of absolute ethanol and 40 ml. of pyridine for about one hour. After removal of ethanol by evaporation the oily residue is washed thoroughly with water to remove pyridine and any chlorides, and then heated under reflux for two to three hours with 30 ml. of anhydrous hydrazine and 250 ml. of ethanol. The resulting solution is poured with stirring into a large volume of water. The white solid product is collected, having the formula:

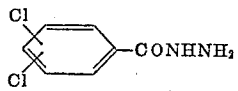

The method of Example 4 is repeated in using the mixed dichlorobenzoic acid hydrazide instead of 2,4-dichlorobenzoic acid hydrazide. The resulting white solids have the following structural formula:

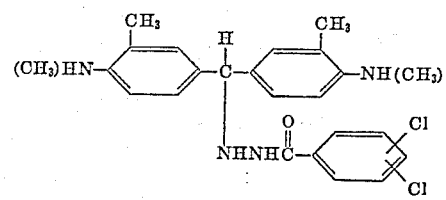

Similar procedure may be used to prepare mixed monochloro or monobromo, trichloro or tribromo, and polychloro or polybromo acyl hydrazine derivatives of bis(4-methylamino-3-methylphenyl)methane by the use of corresponding halogenated benzoic acid hydrazide.

*Example 6*

A mixture of bis(4-methylamino-3-methylphenyl)methamine and p-toluic acid hydrazide in 1:1.1 molar proportion is dissolved in 15 times its weight of absolute ethanol and refluxed for about 8 hours. The reaction mixture is evaporated to dryness. The yellowish residue is thoroughly washed with hot water to remove the unreacted hydrazide, and dissolved in benzene and then run through a paper column to remove the yellow color. A colorless crystalline product is obtained, having the following structural formula:

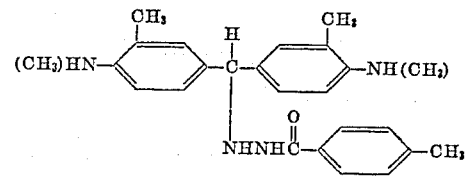

Instead of p-toluic acid hydrazide, other cyclic carboxylic acid hydrazide of the aromatic series may be used to prepare the corresponding acyl hydrazine.

*Example 7*

An equimolar mixture of isonicotinic acid hydrazide and bis(4-methylamino-3-methylphenyl)methanol is dissolved in about 20 times its weight of absolute ethanol and refluxed for about 7 hours. After removal of the solvent, the dark solid residue is treated with activated charcoal. The resulting colorless grainy solids have the following structural formula:

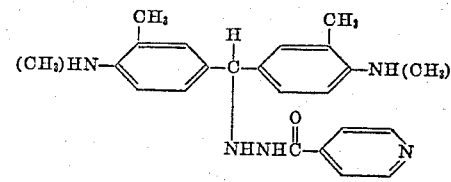

The isonicotinic acid hydrazide may be replaced by one of the following compounds: the hydrazide of nicotinic acid, picolinic acid, tetrachloroisonicotinic acid, 2,6-dichloroisonicotinic acid, 2,6-dihydroxyisonicotinic acid, 3,5-dichloro-2,6-dihydroxyisonicotinic acid and lower alkylated pyridine carboxylic acid in the same molar proportion. Each of the products is a colorless crystalline material.

Example 8

The procedure of Example 6 is repeated in using 2-thiophenic acid hydrazide instead of p-toluoic acid hydrazide instead of p-toluoic acid hydrazide. The resulting product is a white crystalline solid, having the following structural formula:

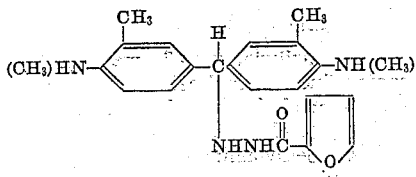

In place of 2-thiophenic acid hydrazide, one of the hydrazides of the following acids may be used in same molar proportion: halogenated, nitrated, or lower alkylated thiophenic acids. They are all substantially colorless crystalline solids except the nitroderivatives which are yellow in color.

Example 9

The procedure of Example 1 is repeated in employing 2-furoic acid hydrazide in lieu of benzoic acid hydrazide. The resulting white crystalline solids have the following structural formula:

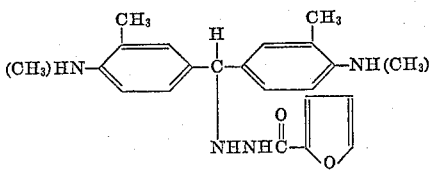

The hydrazides of nitrated, or halogenated furoic acid may be used to replace the furoic acid hydrazide in the same molar ratio. The corresponding acyl hydrazines are substantially colorless solids except the nitro compounds which are yellow.

Example 10

An attapulgite clay known as Attasorb RVM marketed by Minerals and Chemicals of America is sieved on to a sheet of white paper. When a colorless solution containing 1% coloring material of Example 3 in ethanol is dropped on the clay, a deep redish purple spot is produced immidiately.

Example 11

The compound of Example 4 in the form of fine powder is placed on a sheet of white paper. When an ethanol solution containing about 0.6% phosphotungstic acid is dropped on this compound, a vivid violet color is produced.

Example 12

The compound of Example 1 in the form of fine white powder is spread on a piece of white paper. N-propyl or N-octyl gallate is then sieved on top of it. On being put on a hot iron, or exposed to infra-red radiation, the mixture immediately turns reddish blue.

Example 13

A piece of chemically neutral and white cotton or filter paper is impregnated with 1% colorless benzene solution of the coloring material in Example 4 and dried. On being dipped into a 50° to 60° C. water bath containing 0.5% phosphotungstic acid. The colorless treated fabrics turn vivid violet instantaneously and permanently, yet the water bath remains crystal clear and colorless.

From the foregoing examples the one skilled in the arts would have little or no difficulty to produce any aromatic acyl hydrazine derivatives and utilize them in generating any desired shades of colors.

What is claimed is:
1. A compound of the formula

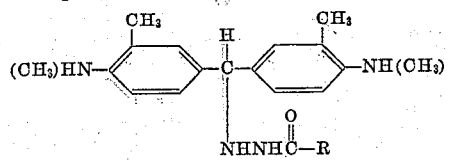

wherein R is a member selected from the group consisting of phenyl, naphthyl, pyridyl, thienyl and furyl and their halogen, lower alkyl, lower alkoxy and nitro substitution derivatives.

2. A compound of the formula

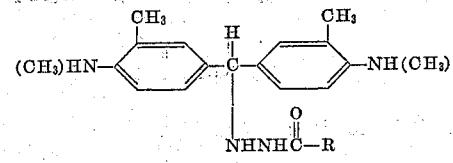

wherein R is chlorinated pyridyl.

3. A compound of the formula

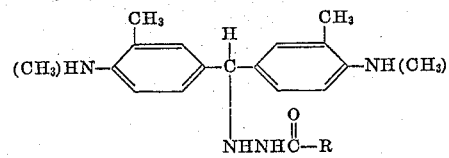

wherein R is tetrachloro-4-pyridyl.

4. A compound of the formula

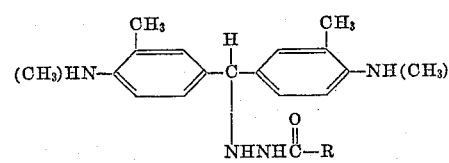

wherein R is chlorinated phenyl.

5. 1 - bis(4 - methylamino - 3 - methylphenyl)methyl-2-dichlorobenzoylhydrazine.
6. 1 - bis(4 - methylamino - 3 - methylphenyl)methyl-2-(2,4-dichlorobenzoyl)hydrazine.
7. 1 - bis(4 - methylamino - 3 - methylphenyl)methyl-2-(3,4-dichlorobenzoyl)-hydrazine.
8. 1 - bis(4 - methylamino - 3 - methylphenyl)methyl-2-nitrobenzoylhydrazine.
9. 1 - bis(4 - methylamino - 3 - methylphenyl)methyl-2-(3-nitrobenzoyl)hydrazine.
10. 1 - bis(4 - methylamino - 3 - methylphenyl)methyl-2-chloronitrobenzoylhydrazine.
11. 1 - bis(4 - methylamino - 3 - methylphenyl)methyl-2-benzoylhydrazine.
12. A compound of the formula

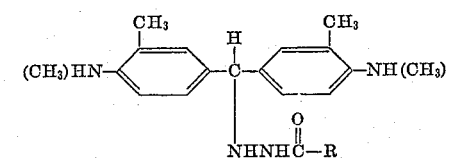

wherein R is 2,6-dihydroxy-3,5-dihalo-4-pyridyl.

13. A compound of the formula

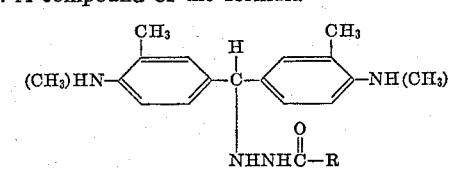

wherein R is halogenated furyl.

14. A compound of the formula

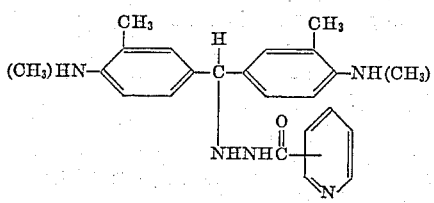

15. A compound of the formula

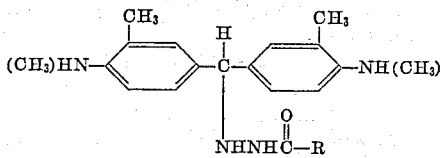

wherein R is 2,6-dichloro-4-pyridyl.

16. A compound of the formula

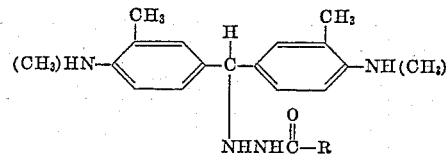

wherein R is 4-pyridyl.

17. 1 - bis(4 - methylamino - 3 - methylphenyl)methyl-2-(halogenated thienoyl)hydrazine.

18. 1 - bis(4 - methylamino - 3 - methylphenyl)methyl-2-(nitrated furoyl)hydrazine.

19. 1 - bis(4 - methylamino - 3 - methylphenyl)methyl-2-(2,6-dihydroxyisonicotinyl)hydrazine.

References Cited in the file of this patent

UNITED STATES PATENTS

| | | |
|---|---|---|
| 2,741,534 | Pedersen | Apr. 10, 1956 |
| 2,900,388 | Tien | Aug. 18, 1959 |